United States Patent [19]

Rogers et al.

[11] Patent Number: 5,380,580
[45] Date of Patent: Jan. 10, 1995

[54] FLEXIBLE NONWOVEN MAT

[75] Inventors: John J. Rogers; John L. Erickson, both of Ramsey; Stephen M. Sanocki, Stillwater, all of Minn.

[73] Assignee: Minnesota Mining and Manufacturing Company, St. Paul, Minn.

[21] Appl. No.: 176,329

[22] Filed: Jan. 3, 1994

Related U.S. Application Data

[63] Continuation of Ser. No. 81,818, Jun. 22, 1993, abandoned, which is a continuation-in-part of Ser. No. 1,325, Jan. 7, 1993, abandoned.

[51] Int. Cl.$^6$ ............................................. D03D 3/00
[52] U.S. Cl. ............................... 428/219; 28/104; 28/107; 55/523; 156/148; 428/224; 428/284; 428/288; 428/297; 428/298; 428/299; 428/300; 428/367; 428/408; 428/902; 428/920
[58] Field of Search ............... 501/95; 428/224, 219, 428/288, 284, 297, 298, 299, 300, 902, 920, 921, 367, 408; 156/148; 28/104, 107; 55/523; 60/299; 429/247

[56] References Cited

U.S. PATENT DOCUMENTS

| | | | |
|---|---|---|---|
| 3,402,055 | 9/1968 | Harris et al. | 106/50 |
| 3,485,706 | 12/1969 | Evans | 161/72 |
| 3,709,706 | 1/1973 | Sowman | 106/57 |
| 3,795,524 | 3/1974 | Sowman | 106/65 |
| 3,876,384 | 4/1975 | Santiago et al. | 23/288 |
| 3,917,785 | 11/1975 | Kalwaites | 264/108 |
| 3,996,145 | 12/1976 | Hepburn | 252/62 |
| 4,070,519 | 1/1978 | Lefkowitz et al. | 428/235 |
| 4,148,962 | 4/1979 | Leiser et al. | 428/366 |
| 4,166,147 | 8/1979 | Lange et al. | 428/328 |
| 4,181,514 | 1/1980 | Lefkowitz et al. | 55/488 |
| 4,435,468 | 3/1984 | Ten Eyck | 428/299 |
| 4,514,880 | 5/1985 | Vaughn | 19/0.35 |
| 4,617,176 | 10/1986 | Merry | 422/179 |
| 4,681,801 | 7/1987 | Eian et al. | 428/283 |
| 4,693,338 | 9/1987 | Clerc | 181/231 |
| 4,752,515 | 6/1988 | Hosoi et al. | 418/300 |
| 4,755,423 | 7/1988 | Greiser et al. | 428/300 |
| 4,761,323 | 8/1988 | Muhlratzer et al. | 428/198 |
| 4,792,478 | 12/1988 | Taylor et al. | 428/299 |
| 4,808,467 | 2/1989 | Suskind et al. | 428/284 |
| 4,847,140 | 7/1989 | Jaskowski | 428/300 |
| 4,861,653 | 8/1989 | Parrish | 428/300 |
| 4,880,168 | 11/1989 | Randall, Jr. et al. | 239/553.5 |
| 4,929,429 | 5/1990 | Merry | 422/179 |
| 4,931,239 | 6/1990 | Hosoi et al. | 264/63 |
| 4,937,212 | 6/1990 | Funkenbusch et al. | 501/95 |
| 4,983,451 | 1/1991 | Sugino et al. | 422/283 |
| 4,996,102 | 2/1991 | Kystoka et al. | 428/285 |
| 5,014,396 | 5/1991 | Nieminen | 19/205 |

(List continued on next page.)

FOREIGN PATENT DOCUMENTS

| | | |
|---|---|---|
| 0148539 | 7/1985 | European Pat. Off. . |
| 0228839 | 7/1987 | European Pat. Off. . |
| 3432283A1 | 3/1986 | Germany . |
| 3514150C1 | 4/1986 | Germany . |
| 3700070A1 | 7/1988 | Germany . |
| 60-252717 | 5/1984 | Japan ............... D01F 9/08 |
| 1417718 | 12/1975 | United Kingdom . |
| 1457931 | 12/1976 | United Kingdom . |
| 1476183 | 6/1977 | United Kingdom . |
| 1568303 | 5/1980 | United Kingdom . |
| 2171180A | 8/1986 | United Kingdom ......... F16L 59/05 |
| WO93/18841 | 9/1993 | WIPO ......................... B01D 39/20 |

OTHER PUBLICATIONS

"Prospects for Key Nonwoven Processes in the U.S.," Starr, *Nonwovens Ind.*, Jun., 1992, pp. 37, 39–41.
"Flow Effects in Monolithic Honeycomb Automotive Catalytic Converters," SAE 740244, Howitt et al., Automotive Engineering Congress, Detroit, MI, Feb. 25–Mar. 1, 1974, pp. 1–9.

(List continued on next page.)

*Primary Examiner*—James J. Bell
*Attorney, Agent, or Firm*—Gary L. Griswold; Walter N. Kirn; Gregory D. Allen

[57] ABSTRACT

The present invention relates to a flexible nonwoven mat comprising physically entangled shot-free ceramic oxide fibers. The flexible nonwoven mat is useful, for example, as filter material, mounting mat, thermal insulation, and sound insulation.

27 Claims, No Drawings

U.S. PATENT DOCUMENTS

| | | | |
|---|---|---|---|
| 5,028,397 | 7/1991 | Merry | 422/179 |
| 5,047,289 | 9/1991 | Arano et al. | 428/300 |
| 5,071,700 | 12/1991 | Sugino et al. | 428/300 |
| 5,104,713 | 4/1992 | Hosoi et al. | 428/300 |
| 5,132,169 | 7/1992 | Olry et al. | 428/300 |
| 5,145,613 | 9/1992 | Arano et al. | 264/8 |
| 5,205,398 | 4/1993 | Hart et al. | 198/780 |
| 5,281,441 | 1/1994 | Kasai et al. | 427/300 |

OTHER PUBLICATIONS

"Thin Wall Ceramics as Monolithic Catalyst Supports," SAE 800082, Howitt, Society of Automotive Engineers, Inc., Warrendale, PA, Feb. 25–29, 1980, pp. 1–9.

"Systems Appraoch to Packaging Design for Automotive Catalytic Converts," SAE 900500, Stroom et al., International Congress and Expositon, Detroit, Mich., Feb. 26–Mar. 2, 1990, pp. 39–50.

Fiberfrax ® Blanket and Mat Products Product Specifications, Form C–1421, 1990, The Carborundum Company, Niagara Falls, N.Y.

Cer–wool ® Ceramic Fiber Products Blanket and Strip Product Brochure, Premier Refractories and Chemicals, Inc., King of Prussia, Pa.

"How Nonwovens are Made," *Guide to Nonwoven Fabrics*, TS 1828.G94, 1978, pp. 18–23.

Laroche Product Brochure, "'Cadette 500' Mini Waste Opener," Laroche Machines Textiles, Cours, France.

PerfoJET Product Brochure, "JET Lace," PerfoJET, Montbonnot, France.

"Prospects for Key Nonwoven Processes in the U.S.," Starr, *Nonwovens Ind.*, Jun. 1992, pp. 38–41.

FLEXIBLE NONWOVEN MAT

This is a continuation of application Ser. No. 08/081,818 filed Jun. 22, 1993, which is a continuation-in-part of application Ser. No. 08/001,325 filed Jan. 7, 1993, now abandoned.

FIELD OF THE INVENTION

The present invention relates to a flexible nonwoven mat comprising physically entangled shot-free ceramic oxide fibers. The flexible nonwoven mat is useful, for example, as filter material, mounting mat, thermal insulation, and sound insulation.

DESCRIPTION OF THE RELATED ART

Nonwoven mats of ceramic fibers, which are useful, for example, as filtration media at elevated temperatures or as catalytic converter mounting media, are known in the art. Typically, it is difficult to obtain a handleable, non-friable mat with sufficient integrity to withstand use as a mounting mat or as a filtration medium unless the fibers are bonded together. Solutions to this problem include bonding the fibers together at their points of intersection (e.g., via sol-gel impregnation, chemical vapor deposition (CVD), or reaction of the fibers during a heating step), stitchbonding the fibers together, or using scrim to hold a mat of fibers in place.

Needle punching of polymeric nonwoven mats and glass nonwoven mats is known in the art. The incorporation of ceramic fibers in such polymeric nonwoven mats is suggested, for example, in U.S. Pat. No. 4,681,801 (Eian et al.).

Needled mat products comprising melt-spun ceramic oxide fibers having a diameter of about 2–3.5 micrometers are available, for example, under the trade designations "FIBERFRAX" from Carborundum Co., Niagara Falls, N.Y., and "CERWOOL" from Premier Refractories and Chemicals, Inc., King of Prussia, Pa. The fibers used in these mats are spun from molten material. These fibers have a silica content up to 54 percent by weight, and an alumina content up to about 54 percent by weight. Typically, the preparation method for such fibers provides significant amounts of shot or particulate matter.

Further, preparation of needle-punched, nonwoven mats of glass-ceramic and/or crystalline ceramic oxide fibers having a diameter greater than 5 micrometers has generally been directed to needle-punching green fibers (i.e., unfired fiber precursor). Such green fibers have substantially greater flexibility than (fired) ceramic oxide fibers. Firing the needle-punched nonwoven mat of green fibers, however, typically provides a rigid mat.

Hydroentanglement of polymeric nonwoven mats, glass nonwoven mats, carbon nonwoven mats, and glass nonwoven mats is known in the art. The incorporation of ceramic fibers in such polymeric nonwoven mats is suggested, for example, in U.S. Pat. No. 4,681,801 (Eian et al.).

SUMMARY OF THE INVENTION

The present invention provides a flexible nonwoven mat comprising shot-free ceramic oxide fibers, wherein at least a portion of the shot-free ceramic oxide fibers are physically entangled, wherein the shot-free ceramic oxide fibers have a diameter greater than 5 micrometers and a length greater than about 1.5 cm, wherein the shot-free ceramic oxide fibers are selected from the group consisting of (a) aluminosilicate-based fibers comprising aluminum oxide in the range from 60 to about 85 percent by weight and silicon oxide in the range from about 40 to about 15 percent by weight silicon oxide, based on the total weight of said aluminosilicate-based fibers, the aluminosilicate-based fibers being at least 20 percent by weight crystalline; (b) crystalline quartz fibers, and (c) mixtures of (a) and (b), and wherein the combined weight of the aluminosilicate-based fibers and the crystalline quartz fibers is at least 50 percent by weight (preferably, at least 60 percent by weight, more preferably, at least about 75 percent by weight, even more preferably, at least about 90 percent by weight, and, most preferably, about 100 percent by weight) of the total weight of the nonwoven mat.

The flexible nonwoven mat can further comprise a high strength fiber such as those selected from the group consisting of silicon carbide fibers, silicon nitride fibers, glass fibers, carbon fibers, metal fibers (e.g., stainless steel fibers, brass fibers, and copper fibers), and mixtures thereof.

The flexible nonwoven mat preferably comprises the aluminosilicate-based fibers. Typically, the flexible nonwoven mat according to the present invention comprises at least 50 percent by weight (preferably, at least 75 percent by weight) of the aluminosilicate-based and/or quartz fibers, based on the high strength fiber content (including the aluminosilicate-based and quartz fibers) of the mat. Preferred shot-free aluminosilicate-based ceramic oxide fibers include aluminosilicate fibers and aluminoborosilicate fibers.

Preferably, the flexible nonwoven mat is essentially free of ceramic fiber having a diameter less than 5 micrometers, more preferably, less than 3 micrometers. In another aspect, the flexible non-woven mat is preferably shot-free.

In another aspect, the present invention provides a method for making a flexible nonwoven mat, the method comprising the steps of:

(a) providing a flexible nonwoven mat comprising shot-free ceramic oxide fibers, wherein the shot-free ceramic oxide fibers have a diameter greater than 5 micrometers and a length greater than about 1.5 cm, wherein the shot-free ceramic oxide fibers are selected from the group consisting of (a) aluminosilicate-based fibers comprising aluminum oxide in the range from 60 to about 85 percent by weight and silicon oxide in the range from about 40 to about 15 percent by weight silicon oxide, based on the total weight of said aluminosilicate-based fibers, the aluminosilicate-based fibers being at least 20 percent by weight crystalline; (b) crystalline quartz fibers, and (c) mixtures of (a) and (b), and wherein the combined weight of the aluminosilicate-based fibers and the crystalline quartz fibers is at least 50 percent by weight (preferably, at least 60 percent by weight, more preferably, at least about 75 percent by weight, even more preferably, at least about 90 percent by weight, and, most preferably, about 100 percent by weight) of the total weight of the nonwoven mat; and (b) physically entangling at least a portion of the shot-free ceramic oxide fibers.

In this application:

"flexible" as used herein refers to a mat that can be bent back upon itself (i.e., folded in half) without breaking more than 25 percent (preferably, 10 percent; more preferably, 1 percent; and, most preferably, without breaking any) of the aluminosilicate-based and quartz fibers present in the mat;

"physical entanglement" as used herein refers physical entanglement of fibers by needle-punching, hydroentangling, or a combination thereof;

"needle-punched" as used herein refers to a nonwoven fibrous mat wherein there is physical entanglement of fibers provided by full or partial (preferably, full) penetration of the mat, for example, by barbed needles;

"hydroentangled" as used herein refers to a nonwoven fibrous mat wherein there is physical entanglement of fibers provided by hydroentangling (also known as water or fluid-jet needling (including water-jet needling and gas (e.g., air)-jet needling), hydraulically entangling, spun lacing, or tangle lacing);

"high strength fiber" as used herein refers to a fiber having an average tensile strength of greater than about 700 MPa (100,000 psi);

"tensile strength" of a fiber is the load under which the fiber breaks divided by the cross-sectional area of the fiber;

"shot-free" as used herein means free of particulate ceramic (i.e., crystalline ceramic, glass, or glass-ceramic) from the fiber manufacture process;

"individualized" as used herein refers to fibers that have been separated from multifilament yarn or to a group of fibers (e.g., a tow) that have been separated to provide individual fibers;

"fugitive fibers" refer to fibers that decompose and volatilize when heated (e.g., organic fibers), or that can be dissolved away (e.g., water soluble fibers);

"binder" as used herein refers to a high temperature (i.e., about 400° C. or more, preferably about 500° C. or more) bonding agent such as colloidal silica, low melting glasses (i.e., up to 1150° C., preferably about 400° to about 800° C.), fluxing agents (e.g., potassia, soda, and boria); and "resilient" refers to the capability of a mat to recover its size and shape after deformation caused by compressive stress.

Rigid, needle-punched, nonwoven mats can be prepared by forming a nonwoven mat from green fibers, needle-punching the green fibered nonwoven mat, and then firing (sintering) the fibers to provide a nonwoven (rigid) mat. If the rigid nonwoven mat is bent back upon itself, the ceramic fibers in the mat break. In contrast, when the flexible, needle-punched, nonwoven mat according to the present invention is bent back upon itself, significantly fewer of the aluminosilicate-based and quartz fibers present in the mat break as compared to that for flexing or breaking a comparable rigid, needle-punched, nonwoven mat in the same manner.

The flexible nonwoven mat according to the present invention is useful, for example, as a mounting mat (e.g., a mounting mat for metal or ceramic monolithic catalytic converters), filtration media (e.g., a diesel exhaust filter element or a high temperature fluid filter (including a filter for molten metal), acoustic insulation, thermal insulation, gasket material, and a catalyst support.

DETAILED DESCRIPTION OF THE PREFERRED EMBODIMENTS

The physical entangled fibers of the mat become locked into place and form a cohesive region without the need for binder or further support (e.g., a scrim). The fibers turn and wind about one another in an interlocking arrangement. Prior to physical entanglement, the fibers of a nonwoven mat or web are lying in substantially two dimensions (i.e., the x- and y-direction), with very few, if any, fibers oriented in the z-direction. The entanglement process causes fibers to turn and wind through the z-direction, interlocking fibers together.

The shot-free ceramic oxide fibers of the mats of the invention preferably have a diameter in the range from greater than 5 to about 20 micrometers. Fibers having a diameter greater than about 20 micrometers are useful but tend to be difficult to form into a nonwoven mat using the processes disclosed herein.

The shot-free ceramic oxide fibers, which typically have an average tensile strength greater than about 700 MPa (100,000 psi), preferably have a length of at least about 1.9 cm. Preferably, the shot-free ceramic oxide fibers have an average tensile strength greater than about 1200 MPa (200,000 psi), more preferably, greater than about 1800 MPa (300,000 psi), and most preferably, greater than about 2100 MPa (350,000 psi).

High strength fibers are typically available in continuous tows (also referred to as rovings) or yarns. The tows or strands typically comprise about 780 to about 7800 individual strands of ceramic oxide fibers. The yarns are usually twisted.

Although the continuous fibers used to prepare the flexible nonwoven mat can be sized or unsized (i.e., essentially free of size), the fibers are preferably sized. Typically, continuous fibers are treated with organic sizing material during their manufacture to provide lubricity and to protect the fiber strands during handling. It is believed that the sizing tends to reduce the breakage of fibers, reduces static electricity, and reduces the amount of dust produced during physical entanglement or other handling steps involved in making the nonwoven mat according to the present invention. The sizing can be removed, for example, after formation of the mat by dissolving or burning it away.

Conventional sizing materials include dextrinized starch gum, gelatin, polyvinyl alcohol, hydrogenated vegetable oils, and non-ionic detergents. A preferred sizing composition which is applied to the crystalline ceramic fibers contains about 90 percent by weight deionized water, 8 percent by weight of polyethylene imine (commercially available, for example, under the trade designation "SC-62J" from Morton International of Chicago, Ill.), about 1-2 percent by weight polyethylene glycol (commercially available, for example, under the trade designation "CARBOWAX 60" from Union Carbide of Danbury, Conn.), and about 0.1 percent by weight of a red dye (commercially available, for example, under the trade designation "PONTAMINE FAST SCARLET 4B" from Mobay Chemical Co. of Union, N.J.).

Preferred aluminosilicate fibers, which are typically crystalline, comprise aluminum oxide in the range from about 67 to about 77 percent by weight and silicon oxide in the range from about 33 to about 23 percent by weight. Sized aluminosilicate fibers are commercially available, for example, under the trade designation "NEXTEL 550" from the 3M Company. Further, suitable aluminosilicate fibers can be made as disclosed, for example, in U.S. Pat. No. 4,047,965 (Karst et al.), the disclosure of which is incorporated herein by reference.

The aluminoborosilicate fibers preferably comprise aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively). The aluminoborosilicate fibers preferably are at least 50 percent by weight crystalline, more preferably, at least 75 percent, and most preferably, about 100% (i.e., crystalline fibers). Sized aluminoborosilicate fibers are commercially available, for example, under the trade designations "NEXTEL 312" and "NEXTEL 440" from the 3M Company. Further, suitable aluminoborosilicate fibers can be made as disclosed, for example, in U.S. Pat. No. 3,795,524 (Sowman), the disclosure of which is incorporated herein by reference.

Sized quartz fibers are commercially available, for example, under the trade designations "ASTROQUARTZ" from J. P. Stevens, Inc., of Slater, N.C.

The flexible nonwoven mat can further comprise up to 40 percent by weight high strength fiber (preferably, sized) (based on the total weight of the nonwoven mat) selected from the group of fibers consisting of silicon carbide fibers (commercially available, for example, under the trade designations "NICALON" from Nippon Carbon of Tokyo, Japan, or Dow Corning of Midland, Mich.; and "TYRANNO" from Textron Specialty Materials of Lowell, Mass.), carbon (e.g., graphite) fibers (commercially available, for example, under the trade designation "IM7" from Hercules Advanced Material and Systems of Magna, Utah), silicon nitride fibers (available, for example, from Toren Energy International Corp. of New York, N.Y.), glass fibers (such as magnesium aluminosilicate glass fibers (commercially available, for example, under the trade designation "S2-GLASS" from Owens-Corning Fiberglas Corp. of Granville, Ohio)), metal fibers (e.g., stainless steel fibers (commercially available, for example, under the trade designation "BEKINOX" from Bekaert of Zweregan, Belgium)), and mixtures thereof. Metal fibers can be useful, for example, as a resistance heater, or can be used to fuse the mat to a metal surface. The use of fibers such as those made of glass can lower the overall cost of the flexible nonwoven mat.

The flexible nonwoven mat according to the present invention can further comprise up to 25 percent by weight (based on the total weight of the mat) fugitive material (e.g., heat fugitive materials such as thermoplastic, nylon, and rayon fibers, powders, films, and webs, and water soluble materials such as polyvinyl alcohol). Thermoplastic fibers, for example, are known in the art and are commercially available, for example, from Hoechst-Celanese of Summit, N.J. Thermoplastic fibers can be useful, for example, to bond, when sufficiently heated, to ceramic fibers comprising the mat to aid in holding the mat together and to increase the mat handleability. Further, fugitive fibers can be burned or dissolved out of the mat to provide a desired structure or porosity. Fugitive materials can be incorporated during formation of the flexible nonwoven mat. Fugitive materials can also be incorporated into the flexible nonwoven mat by soaking or spraying the mat with fugitive material.

Binders can be incorporated into the flexible nonwoven mat, for example, by saturating or spraying the mat with binder.

To provide individualized (i.e., separate each fiber from each other) fibers, a tow or yarn of fibers can be chopped, for example, using a glass roving cutter (commercially available, for example, under the trade designation "MODEL 90 GLASS ROVING CUTTER" from Finn & Fram, Inc., of Pacoma, Calif.), to the desired length (typically in the range from about 1.9 to about 15 cm).

For nonwoven mats that are to be hydroentangled, it is preferred to partially individualize or separate the cut fibers using a conventional web-forming machine such as that commercially available under the trade designation "DAN WEB" from ScanWeb Co. of Denmark.

The cut or chopped aluminosilicate-based and/or quartz fibers are then separated or individualized using mechanical means such as passing them through a conventional hammer mill (e.g., commercially available under the trade designation "BLOWER DISCHARGE MODEL 20 HAMMER MILL" from C. S. Bell Co. of Tiffin, Ohio), or through a mini-waste opener (commercially available, for example, under the trade designation "CADETTE 500" from Laroche Machine Textiles, Cours, France). If a hammer mill is used, the chopped fibers are passed through it at least twice. Although less effective, the fibers can be individualized using a conventional blower such as that commercially available under the trade designation "DAYTON RADIAL BLOWER," Model 3C 539, 31.1 cm (12.25 inches), 3 horsepower, from W. W. Grainger of Chicago, Ill. If a blower is used alone, the fibers are typically passed through it at least twice. Alternatively, the fibers can be separated or individualized by passing them one or more times through the lickerin section of a conventional web-forming machine (commercially available, for example, under the trade designation "RANDO WEBBER" from Rando Machine Corp. of Macedon, N.Y.).

Although not wanting to be bound by theory, it is believed that the higher tensile strengths allow for the formation of chopped and separated fibers without simultaneously pulverizing the fibers into powder. Preferably, at least 50 percent by weight of the fibers are individualized before they are formed into a nonwoven mat. Although cut or chopped fibers greater than about 15 cm are also useful in preparing the nonwoven mat, they tend to be more difficult to process. Separation of the fibers tends to increase the loftiness (i.e., decrease the bulk density) of the fibers making up the nonwoven mat, thereby lowering the density of the resulting mat.

To facilitate processing and separation of the chopped or cut fibers, the fibers and the separation equipment are preferably conditioned at about 60-85 percent (more preferably, about 80-85 percent) relative humidity. Alternatively, an antistatic lubricant (e.g., such as that commercially available under the trade designation "NEUTROSTAT" from Simco Co., Inc., of Hatfield, N.J.) or a light weight hydrocarbon oil (e.g., such as that commercially available under the trade designation "702ETL" from Moroil Corporation of Charlotte, N.C.) can be coated onto the fibers and/or sprayed into the fiber separation equipment while the fibers are being separated. It is believed that the use of the preferred humidities and/or an antistatic lubricant or a light weight hydrocarbon oil minimize static electric buildup on the fibers. Further, it is believed that the use of an antistatic lubricant minimizes breakage of the fibers during processing.

The chopped, individualized fibers are then fed, preferably using a conventional fiber feeding system (commercially availble, for example, under the trade designations "MODEL 118DCF CROMTEX FIBER METER" from Cromtex Textile Machinery Corp. of Mauldin, S.C. or "CMC EVENFEED" from Carolina Machinery Co. of Charlotte, N.C.), into a conventional web-forming machine (commercially available, for example, under the trade designation "RANDO WEBBER" from Rando Machine Corp.; or "DAN WEB" from ScanWeb Co. of Denmark), wherein the fibers are drawn onto a wire screen or mesh belt (e.g., a metal or nylon belt). Fibers having a length greater than about 2.5 cm tend to become entangled during the web formation process. To facilitate ease of handling of the mat, the mat can be formed on or placed on a scrim. Depending upon the length of the fibers, the resulting mat may have sufficient handleability to be transferred to physical entanglement equipment (e.g., a needle-punching machine or a hydroentanglement unit) without the need for a support (e.g., a scrim).

The nonwoven mat can then be needle punched and/or hydroentangled.

The nonwoven mat can be needle punched using a conventional needle-punching apparatus (e.g., a needle puncher commercially available under the trade designation "DILO" from Dilo of Germany, with barbed needles (commercially available, for example, from Foster Needle Company, Inc., of Manitowoc, Wis.)) to provide the needle-punched, nonwoven mat according to the present invention. Needle punching, which provides entanglement of the fibers, typically involves punching and drawing barbed needles through the mat.

Typically, a nonwoven mat to be needle punched is at least about 0.3175 cm (⅛ inch) thick. Mats below this thickness tend to have insufficient integrity to be needle punched.

The optimum number of needle punches per area of mat will vary depending on the particular application. Typically, the nonwoven mat is needle punched to provide an average of at least 5 needle punches/cm$^2$. Preferably, the mat is needle punched to provide an average of about 5 to 60 needle punches/cm$^2$, more preferably, an average of about 10 to about 20 needle punches/cm$^2$.

The nonwoven mat can be hydroentangled using a conventional water entangling unit (commercially available from Honeycomb Systems Inc. of Bidderford, Me.; also see U.S. Pat. No. 4,880,168 (Randall, Jr.), the disclosure of which is incorporated herein by reference for its teaching of fiber entanglement). Although the preferred liquid to use with the hydroentangler is water, other suitable liquids may be used with or in place of the water. Preferably, the nonwoven mat is wet with the liquid before it is subjected to hydroentanglement.

For the water-entangling unit supplied by Honeycomb Systems Inc., a high pressure liquid (preferably water) is delivered in a curtain-like array onto a nonwoven mat or web which passes beneath the curtain of liquid streams. The mat or web is supported by a wire screen, which acts as a conveyor belt. The mat feeds into the entangling unit on the wire screen conveyor about 2.5 cm beneath the jet orifices. The mat travels at about 6 cm/sec through the curtain of water streams. The wire screen is selected depending upon the final desired appearance of the entangled mat. For example, a coarse screen (e.g., 4 mesh, with openings of about 0.63 cm$^2$) will produce a mat having perforations corresponding to the holes in the screen. A very fine screen (e.g., 100 mesh), however, typically produces a mat without the appearance of perforations.

Preferably, a nonwoven mat is pre-wet, for example, by passing it under a liquid (e.g., water) stream at low water pressure (e.g., up to about 350 kPa (50 psi)) before hydroentanglement. The pre-wet mat is then subjected to high jet stream pressure (e.g., for the water-entangling unit supplied by Honeycomb Systems Inc. preferably in the range from about 1400 kPa (200 psi) to about 5500 kPa (800 psi), although for coarse screen sizes (e.g., 4 mesh), the preferred jet stream pressure is in the range from about 1400 kPa (200 psi) to about 3800 kPa (550 psi)).

Typically, a nonwoven mat to be hydroentangled is at least about 0.08 cm (1/32 inch) thick. Mats below this thickness tend to have insufficient integrity to be hydroentangled. In another aspect, mats thicker than about 0.63 cm (¼ inch) are not hydroentangled through their full thickness. Such thick mats, however, can be further hydroentangled by subjecting both major surfaces of the mat to the jets (i.e., to the hydroentangling process).

Preferably, a flexible, needle-punched, nonwoven mat according to the present invention has a weight per unit area value in the range from about 50 to about 5000 g/m$^2$, and in another aspect a thickness in the range from about 0.3 to about 5 centimeters. If the mat is used, for example, as filter media, the mat preferably has a weight per unit area value in the range from about 150 to about 300 g/m$^2$. If the mat is used, for example, as insulation, the mat preferably has a weight per unit area value in the range from about 300 to about 5000 g/m$^2$.

Preferably, a flexible, hydroentangled, nonwoven mat according to the present invention has a weight per unit area value in the range from about 25 to about 250 g/m$^2$, and in another aspect a thickness in the range from about 0.08 cm (1/32 inch) to about 0.32 cm (⅛ inch). If the mat is used, for example, as filter media, the mat preferably has a weight per unit area value in the range from about 50 to about 250 g/m$^2$. If the mat is used, for example, as insulation, the mat preferably has a weight per unit area value of at least 50 g/m$^2$.

Optionally, two or more different mats can be needle punched and/or hydroentangled together. For example, a nonwoven mat comprising the aluminosilicate-based fibers can be needle punched to a nonwoven mat comprising the quartz fibers. A nonwoven mat comprising the aluminosilicate-based fibers can be needle punched to a nonwoven (or woven) mat comprising, for example, silicon carbide fibers, silicon nitride fibers, glass fibers, carbon fibers, stainless steel fibers, thermoplastic fibers, or mixtures thereof.

Preferably, a nonwoven mat according to the present invention comprising aluminoborosilicate fibers (commercially available, for example, under the trade designations "NEXTEL 312" and "NEXTEL 440" from the 3M Company) is needle punched to a nonwoven mat comprising high tensile strength glass fibers (commercially available, for example, under the trade designation "S2-GLASS" from Owens-Corning Fiberglas Corp.).

A shot-free nonwoven mat according to the present invention is desirable because such a mat tends to be more resilient and have a higher filter efficiency per unit weight than conventional nonwoven mats containing shot.

The flexible nonwoven mat according to the present invention is useful as a mounting mat (e.g., a catalytic converter mounting mat), high temperature insulation, electrical insulation (e.g., battery separator), ceramic preform for chemical vapor deposition, catalyst support, and filter media. Filtration uses include applications requiring filtration of suspended or dispersed particle from a high temperature gas stream (e.g., refinery process gas streams or combustion gases), molten metal, or a corrosive fluid. Catalysts which may be coated onto the flexible nonwoven mat include conventional catalysts such as metals (e.g., ruthenium, osmium, rhodium, iridium, nickel, palladium, and platinum) and metal oxides (e.g., vanadium pentoxide and titanium dioxide).

The nonwoven mat according to the present invention can be use to provide a composite article comprising a nonwoven mat, a first coating thereon comprising a carbonaceous matrix which optionally includes boron nitride particles in contact therewith, and a second coating comprising silicon carbide. A preferred method for providing the first and second coatings is disclosed in Assignee's copending application entitled "High Temperature Ceramic Composite," U.S. Ser. No. 07/747,647, filed Aug. 20, 1991, the disclosure of which is incorporated herein by reference, although such a composite article incorporating the nonwoven mat according to the present invention optionally includes the boron nitride particles. The composite article is useful, for example, as a gas burner nozzle liner, a radiant burner, a heat exchanger, a thermowell, a core buster, or flame disperser, and other gas fired furnace components.

Objects and advantages of this invention are further illustrated by the following examples, but the particular materials and amounts thereof recited in these examples, as well as other conditions and details, should not be construed to unduly limit this invention.

EXAMPLES

Examples 1 and 2

Example 1 was prepared by chopping tows of 10–12 micrometer diameter aluminoborosilicate fibers (commercially available under the trade designation "NEXTEL 312" from the 3M Company) into 2.5 cm (1 inch) lengths using a conventional glass roving cutter (commercially available under the trade designation "MODEL 90 GLASS ROVING CUTTER" from Finn & Fram, Inc.). The lengths were passed twice through a conventional hammer mill (commercially available under the trade designation "BLOWER DISCHARGE MODEL 20 HAMMER MILL" from C. S. Bell Co.). The screen located in the hammer mill chamber was removed. The hammer mill speed was about 1850 rpm. The fiber lengths were then placed into a conventional fiber feeding system (commercially available under the trade designation "MODEL 118DCF CROMTEX FIBER METER" from Cromtex Textile Machinery, Corp. of Mauldin, S.C.), prior to feeding them into a conventional web-forming machine (commercially available under the trade designation "DAN WEB" from ScanWeb Co. of Denmark), wherein the fibers were drawn onto a wire screen. The weight per unit area value of the mat was about 1000 g/m$^2$. The thickness of the mat was about 1.25 cm. The mat was then needle punched using a conventional needle-punching apparatus (commercially available under the trade designation "DILO" from Dilo of Germany, with type #15x18x36x3.5 RB barbed needles (commercially available from Foster Needle Company, Inc. of Manitowoc, Wis.)) to provide about 15 punches/cm$^2$. The barbed needles were punched through the full thickness of the mat.

Example 2 was prepared as described above for Example 1, except the 10–12 micrometer diameter aluminoborosilicate fiber used was that commercially available under the trade designation "NEXTEL 440" from the 3M Company.

The resiliency of each nonwoven mat was measured using a compression tester (commercially available under the trade designation "INSTRON TESTER," Model #1130, from Instron Corp. of Canton, Mass.) modified to have two vertically aligned, stainless steel anvils each with a 2.5 cm diameter face. To allow for simulation of elevated temperatures, each anvil contained a cartridge heater. Further, the distance between the anvil faces was adjustable. The resiliency of the mats were tested by placing each between the two opposite faces of the anvils and then closing the gap between the anvils faces to 0.531 mm and 0.333 mm, respectively. The pressure exerted on the mat by the anvils was then recorded. While reducing the gap width between the anvils to 0.505 mm and 0.303 mm, respectively, the top anvil was heated from room temperature (i.e., about 25° C.) to about 800° C. and the bottom anvil from room temperature to about 430° C. The pressure exerted on the mat by the anvils was then recorded. Finally, the heaters were turned off and the anvils (and mat) cooled back to room temperature, while the gap between the anvils was adjusted back to 0.531 mm and 0.333 mm, respectively. The mount density was determined based on the gap width and the original thickness and density of the mat. The test results are given in Table 1, below.

TABLE 1

| Example | Anvil temperature, top/bottom, °C. | Mount density, g/cm$^3$ | Gap, mm | Pressure, MPa |
|---|---|---|---|---|
| 1 | 25/25 | 0.77 | 0.531 | 0.35 |
|   | 800/430 | 0.82 | 0.505 | 0.36 |
|   | 25/25 | 0.77 | 0.531 | 0.13 |
| 2 | 25/25 | 0.77 | 0.333 | 0.4 |
|   | 800/430 | 0.82 | 0.307 | 0.43 |
|   | 25/25 | 0.77 | 0.333 | 0.13 |

Example 3

Example 3 was prepared as described in Example 2, except the weight per unit area value of the needle-punched, nonwoven mat was about 680 g/m$^2$, and the thickness of the mat was about 0.95 cm.

The effectiveness of the needle-punched, nonwoven mat of Example 3 as a filter media for filtering mean diameter 0.1 micrometer diameter particles was evaluated using a conventional filter tester (commercially available under the trade designation "TSI AUTOMATED FILTER TESTER AFT-8110" from TSI, Inc., of St. Paul, Minn.). The liquid composition filtered was a 2% NaCl solution having a mass concentration of 100 mg/m$^3$. The size distribution of the NaCl particles, which ranged from about 0.01 to about 0.45 micrometer, had a mean particle size of about 0.1 micrometer, and was measured using a conventional particle size analyzer (commercially available under the trade designation "TSI DIFFERENTIAL MOBILITY PARTICLE SIZER" from TSI, Inc.).

The needle-punched, nonwoven mat was cut to provide a 8.9 cm diameter, 0.95 cm thick filter pad. The filter efficiency of the filter pad was tested for about 2 hours at an average flow rate of about 60 liters/minute. The filter efficiency of the filter pad at the beginning of the test was about 31%, with a pressure drop across the thickness of the pad of about 2.4 mm $H_2O$. The filter efficiency of the filter pad at the end of the test was about 89%, with a pressure drop across the thickness of the pad of about 20.2 mm $H_2O$.

Example 4

Example 4 was a bi-layer, nonwoven needle-punched mat comprising a layer of aluminoborosilicate fibers and a layer of glass fibers. Tows of 12 micrometer diameter aluminoborosilicate fibers ("NEXTEL 440") were cut into 2.5 cm (1 inch) lengths using a conventional glass roving cutter ("MODEL 90 GLASS ROVING CUTTER"). The lengths were passed twice through a conventional hammer mill ("BLOWER DISCHARGE MODEL 20 HAMMER MILL"). The screen located in the hammer mill was removed. The hammer mill speed was about 1850 rpm. The fiber lengths were fed into a conventional web-forming machine (commercially available under the trade designation "RANDO WEBBER" from Rando Machine Corp. of Macedon, N.Y.), wherein the fibers were blown onto a porous metal (wire screen) condenser. The weight per unit area value of the mat was about 1000 g/m$^2$, the thickness about 1.25 cm.

The layer comprising glass fibers was prepared as described for the layer comprising the aluminoborosilicate fibers, except 9-10 micrometer diameter magnesium aluminosilicate glass fibers (commercially available under the trade designation "S2-GLASS" from the Owens-Corning Fiberglas Corp. of Granville, Ohio) were used. The glass fiber layer was laid over the aluminoborosilicate fiber layer, and the two layers were then needle punched together using a conventional needle-punching apparatus ("DILO") to provide about 15 punches/cm$^2$. The barbed needles were punched through the full thickness of both layers.

The resulting nonwoven mat was about 1.2 cm thick. The thermal conductivity of the mat was measured using a conventional guarded hot thermal conductivity apparatus (commercially available as Model #TC-FGM-N4 from Dynatech, Inc. (since acquired by Holometrix of Cambridge, Mass.)). The thermal conductivity of the mat at about 540° C. and about 646° C. was about 0.13 watts/m.°C. and about 0.18 watts/m.°C., respectively.

Example 5

Example 5 was prepared as described above for Example 1, except equal amounts of 12 micrometer diameter aluminoborosilicate fiber ("NEXTEL 440") and 9-10 micrometer diameter magnesium aluminosilicate glass fibers ("S2-GLASS") were used to provide a needle-punched, nonwoven mat comprising aluminoborosilicate fibers and magnesium aluminosilicate glass fibers. The nonwoven mat prior to needle punching was about 0.95 cm thick, and had a density of about 350 g/m$^2$. The needle-punched mat was about 0.63 cm thick. A 0.63 cm thick nonwoven web (obtained from Rando Machine Corp.) of stainless steel fibers (20 micrometer diameter fibers) was then needle punched to the needle-punched nonwoven web of aluminoborosilicate and magnesium aluminosilicate glass fibers by punching the barb needles through both webs.

Example 6

Example 6 was prepared as described above for Example 1, except 9 micrometer diameter crystalline quartz fiber (commercially available under the trade designation "ASTROQUARTZ, TYPE 552" (end count 20, binder 9366-B) from J. P. Stevens Glass Fabrics of Slater, S.C.) was used in place of the aluminoborosilicate fiber. The weight per unit area value of the nonwoven mat was about 800 g/m$^2$. The thickness of the mat was about 0.95 cm. The mat was needle punched to provide about 30 punches/cm$^2$.

Comparative I

Tows of 12 micrometer diameter alpha alumina fiber (greater than 99% aluminum oxide, 0.2-0.3% silicon oxide, 0.4-0.7% iron oxide, calculated on a theoretical oxide basis as $Al_2O_3$, $SiO_2$, and $Fe_2O_3$, respectively; commercially available under the trade designation "NEXTEL 610" from the 3M Company) were cut into 2.5 cm (1 inch) lengths using a conventional glass roving cutter ("MODEL 90 GLASS ROVING CUTTER"). The lengths were passed twice through a conventional hammer mill ("BLOWER DISCHARGE MODEL 20 HAMMER MILL"). The screen located in the hammer mill chamber was removed. The hammer mill speed was about 1850 rpm. The fiber lengths were then placed into a conventional fiber feeding system ("MODEL 118DCF CROMTEX FIBER METER"), prior to feeding them into a conventional web-forming machine ("DAN WEB"), wherein the fibers were drawn onto a wire screen. The weight per unit of the mat was about 600 g/m$^2$. The thickness of the mat was about 0.63 cm.

The mat was needle punched using a conventional needle-punching apparatus ("DILO") to provide about 30 punches/cm$^2$. Needle punching resulted in very little entanglement and significant breakage of the alumina fibers.

Example 7

Example 7 was prepared by chopping tows of 10-12 micrometer diameter aluminoborosilicate fibers ("NEXTEL 440") into 2.5 cm (1 inch) lengths using a conventional glass-roving cutter ("MODEL 90 GLASS ROVING CUTTER"). The cut fibers were then passed through a conventional fiber-forming machine ("DAN WEB"). Next, the lengths were passed through the lickerin section of a conventional web-forming machine ("RANDO WEBBER"). The lickerin was running at approximately 900 rpm. The fiber lengths were then placed into a conventional fiber-feeding system (61 cm (2 feet) wide; commercially available as "CMC EVENFEED" from Carolina Machinery Co., Charlotte, N.C.) prior to feeding them into a conventional web-forming machine ("DAN WEB"), wherein the fibers were drawn onto a wire screen. The weight per unit area value of the mat was about 125 g/m$^2$. The thickness of the mat was about 0.3175 cm (0.125 in).

The mat was then hydroentangled using a laboratory, single-head, water-entangling unit (commercially available from Honeycomb Systems Inc. of Bidderford, Me.). The unit was equipped with a coarse 30 mesh-type stainless steel woven screen which was located about 2.5 cm (1 inch) below the water-jet head. The water-jet head had a single row of sixteen 0.127 mm (0,005 inch) diameter orifices per cm (40 per inch). The length of the head was 61 cm (24 inches). The web was passed under the single head water-jet perpendicular to the row of orifices three times. For the first pass, the water pressure was set at a low value (i.e., up to about 350 kPa 50 psi) to pre-wet the web structure. The water pressure under the head during the second pass was about 2400 kPa (350 psi). The water pressure under the head during the final pass was about 4500 kPa (650 psi). The line speed for all three passes was about 3.7 m/min (12 fpm). After the third pass, the web was dried using a conventional hot air oven.

The resulting web had a smooth, non-perforated appearance and could easily be bent back upon itself. The web could be cut into mats using conventional techniques.

Example 8

Example 8 was prepared as described in Example 7, except about 50 percent by weight blend of the fibers were 2.5 cm (1 inch) aluminoborosilicate fiber ("NEXTEL 440") and about 50 percent by weight blend of the fibers were 5 cm (2 inch) aluminoborosilicate fiber ("NEXTEL 440"). The resulting web had a smooth, non-perforated appearance and could easily be bent back upon itself.

Example 9

Example 9 was prepared as described in Example 7 except (1) a "RANDO WEBBER"-type web-forming machine was used to form the mat prior to hydroentangling, rather than a "DAN WEB"-type web-forming machine; (2) 2.5 cm (1 inch) long 10–12 diameter aluminoborosilicate ceramic fiber ("NEXTEL 312") were used in place of the "NEXTEL 440"-type ceramic fibers; and (3) a 16 mesh screen was used in place of the 30 mesh screen in the hydroentangling unit. The resulting web had a smooth, slightly perforated appearance and could easily be bent back upon itself. The weight per unit area of the mat was about 200 g/m$^2$.

Example 10

Example 10 was prepared as described in Example 7 except (1) 85 percent by weight of the fibers were 2.5 cm (1 inch) long, 10–12 micrometer diameter aluminosilicate fibers (commercially available under the trade designation "NEXTEL 550" from the 3M Company), and 15 percent by weight 4 cm long (1.6 inch), 1.5 denier rayon fibers (commercially available from Courtaulds Fiber Inc. of Axis, Ala.); (2) the web was formed on a screen in the hydroentangling unit having 0.63 cm (0.25 inch) diameter openings; and (3) the web was passed twice through the water jet. For the first pass, the water pressure was set at a low value (i.e., up to about 350 kPa 50 psi) to pre-wet the web structure. The water pressure under the head during the second pass was about 4100 kPa (600 psi).

The resulting web had the perforated appearance of the hydroentangling unit screen and could easily be bent back upon itself. The web had a weight per unit area value of 100 g/m$^2$.

Example 11

Example 11 was prepared as described in Example 10 except 3.8 cm (1.5 inch) long, 6 denier fibers (polyester core with a copolyester sheath; commercially available under the trade designation "CELBOND" from Hoechst-Celanese of Charlotte, N.C.) were used in place of the rayon staple fibers, and the water pressure under the head during the second pass was about 3500 kPa (500 psi).

The resulting web had the perforated appearance of the hydroentangling unit screen and could easily be bent back upon itself. The web had a weight per unit area value of 100 g/m$^2$.

Example 12

Example 12 was prepared as described in Example 10 except 90 percent by weight were 10–12 micrometer diameter aluminosilicate fibers ("NEXTEL 550") and 10 percent by weight of the fibers were polyvinyl alcohol fibers (commercially available under the trade designation "TYPE VPB101" from Kurray Inc. of Japan).

The resulting web had the perforated appearance of the hydroentangling unit screen and could easily be bent back upon itself.

Example 13

Example 13 was prepared as described in Example 7 except (1) 50 percent by weight of the fibers were 2.5 cm (1 inch) long, aluminoborosilicate fibers ("NEXTEL 312"), and 50 percent by weight of the fibers were 2.5 (1 inch) long, 10 micrometer diameter carbon fibers (commercially available under the trade designation "MAGNAMITE, TYPE AS4-12K" from Hercules Inc. of Magna, Utah); (2) the screen of the hydroentangling unit was 16 mesh; and (3) water pressures of 2100 kPa (300 psi) and 4800 kPa (700 psi) on the second and third passes, respectively.

The resulting web had a weight per unit area value of 100 g/m$^2$, and could easily be bent back upon itself.

Example 14

Example 14 was prepared as follows. Two webs were prepared as described in Example 7, with the following exceptions. One web was made from 2.5 cm (1 inch) long, 10–12 micrometer diameter aluminoborosilicate fibers ("NEXTEL 312"). A second web was made of 2.5 cm (1 inch) long, 10 micrometer diameter carbon fibers ("MAGNAMITE, TYPE AS4-12K"). The weight per unit area value of each web was 100 g/m$^2$. Two major surfaces of each web were placed together and then they were hydroentangled together. The screen used in the hydroentangling unit was 100 mesh. The water pressure for the second and third passes were 1400 kPa (200 psi) and 4800 kPa (700 psi), respectively.

The water passed from the aluminoborosilicate web to the carbon web during the second pass, and the carbon web to the aluminoborosilicate web during the third pass. Each side went through three passes.

The resulting web had a weight per unit area value of 200 g/m$^2$, and could easily be bent back upon itself.

Example 15

Example 15 was prepared as described in Example 7 except (1) 1.9 cm (0.75 inch) long, 10–12 micrometer diameter aluminoborosilicate fiber ("NEXTEL 312") was used in place of the aluminosilicate fiber; (2) the screen used in the hydroentangling unit was 30 mesh; and (3) the water pressure was about 2100 kPa (300 psi) during the second pass and about 2800 kPa (400 psi) during the third pass.

The resulting web had a smooth, non-perforated appearance and could be easily be bent back upon itself.

Example 16

Example 16 was prepared as described in Example 7 except (1) the weight per unit area value of the hydroentangled nonwoven mat was about 120 g/m²; (2) the thickness of the mat was about 0.159 cm; and (3) the fibers were 2.5 cm (1 inch) long, 10–12 micrometer diameter aluminoborosilicate ("NEXTEL 312") fibers.

The effectiveness of the hydroentangled nonwoven mat of Example 16 as a filter media for filtering mean diameter 0.1 micrometer diameter particles was evaluated using a conventional filter tester ("TSI AUTOMATED FILTER TESTER AFT-8110"). The liquid composition filtered was a 2% NaCl solution having a mass concentration of 100 mg/m³. The size distribution of the NaCl particles, which ranged from about 0.01 to about 0.45 micrometer, had a mean particle size of about 0.1 micrometer, and was measured using a conventional particle size analyzer ("TSI DIFFERENTIAL MOBILITY PARTICLE SIZER").

The hydroentangled nonwoven mat was doubled over and cut to provide a 8.9 cm diameter, 0.318 cm thick filter pad. The filter efficiency of the filter pad was tested for about 2 hours at an average flow rate of about 40 liters/minute. The filter efficiency of the filter pad at the beginning of the test was about 20%, with a pressure drop across the thickness of the pad of about 1.0 mm $H_2O$. The filter efficiency of the filter pad at the end of the test was about 99%, with a pressure drop across the thickness of the pad of about 30.0 mm $H_2O$.

Example 17

Example 17 was prepared as follows. Aluminoborosilicate yarn comprising 10–12 micrometer diameter fibers (1800 denier, 2/2, 0.6 z twists per cm (1.5 z twist per inch); "NEXTEL 440" was texturized using an air jet texturizing machine (commercially available under the trade designation "MODEL 17 SIDEWINDER" with a "MODEL 52D JET" from Enterprise Machine and Development Corp. of New Castle, Del.). The speed of the texturizing machine was set at about 26.5 meters per minute. The jet was opened about ¾ turn from its most closed position. The air pressure was set at about 790 kPa. The texturized yarn was cut using a conventional rotary cutter (commercially available from Laroche Machine Textiles, Cours, France, as "TYPE 231").

The yarn was then sprayed with a light weight hydrocarbon oil (which included emulsifiers) to provide a textile surface finish (commercially available from Moroil Corporation, Charlotte, N.C., as "702ETL"), and then passed through a mini-waste opener (commercially available from Laroche Machine Textiles, Cours, France, as "CADETTE 500") to individualize the fibers. The cylinders were run at 1100 rpm (cylinder 1 was 6500 straight pin and cylinder 2 was 8500 straight pin). The individualized fiber lengths were then placed into a conventional fiber feeding system ("CMC EVENFEED"), prior to feeding them into a conventional web-forming machine ("DAN WEB"), wherein the fibers were drawn onto a wire screen. The weight per unit area value of the mat was about 400 g/m². The thickness of the mat was about 0.63 cm (0.25 inch).

The mat was then needle punched using a conventional needle-punching apparatus as described in Example 1. The barbed needles were punched through the full thickness of the mat.

The resulting needle-punched mat was flexible and could easily be bent back upon itself.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A flexible nonwoven mat comprising shot-free ceramic oxide fibers, wherein at least a portion of said shot-free ceramic oxide fibers are physically entangled, wherein said shot-free ceramic oxide fibers have a diameter greater than 5 micrometers and a length greater than about 1.5 cm, wherein said shot-free ceramic oxide fibers are selected from the group consisting of (a) aluminosilicate-based fibers comprising aluminum oxide in the range from 60 to about 85 percent by weight and silicon oxide in the range from about 40 to about 15 percent by weight silicon oxide, based on the total weight of said aluminosilicate-based fibers, said aluminosilicate-based fibers being at least 20 percent by weight crystalline; (b) crystalline quartz fibers, and (c) mixtures of (a) and (b), and wherein the combined weight of said aluminosilicate-based fibers and said crystalline quartz fibers is at least 50 percent by weight of the total weight of said nonwoven mat.

2. The flexible nonwoven mat according to claim 1, wherein the combined weight of said aluminosilicate-based fibers and said crystalline quartz fibers is at least 60 percent by weight of the total weight of said nonwoven mat.

3. The flexible nonwoven mat according to claim 1, wherein the combined weight of said aluminosilicate-based fibers and said crystalline quartz fibers is at least about 75 percent by weight of the total weight of said nonwoven mat.

4. The flexible nonwoven mat according to claim 3, wherein said mat can be bent back upon itself without breaking more than 10 percent of said aluminosilicate-based fibers and said crystalline quartz fibers present.

5. The flexible nonwoven mat according to claim 3 having an average of at least 5 needle punches/cm².

6. The flexible nonwoven mat according to claim 3, wherein at least a portion of said shot-free ceramic oxide fibers are hydroentangled.

7. The flexible nonwoven mat according to claim 3, wherein said shot-free ceramic oxide fibers are aluminosilicate-based fibers.

8. The flexible nonwoven mat according to claim 7, wherein said aluminosilicate-based fibers are crystalline fibers which comprise about 67 to about 77 percent by weight aluminum oxide and about 33 to about 23 percent by weight silicon oxide.

9. The flexible nonwoven mat according to claim 7, wherein said shot-free ceramic oxide fibers are crystalline fibers.

10. The flexible nonwoven mat according to claim 7, wherein said aluminosilicate-based fibers are aluminoborosilicate fibers.

11. The flexible nonwoven mat according to claim 10, wherein said aluminoborosilicate fibers comprise about 55 to about 75 percent by weight aluminum oxide, less than 45 to greater than zero percent by weight silicon oxide, and less than 25 to greater than zero percent boron oxide by weight, based on the total weight of said aluminoborosilicate fibers.

12. The flexible nonwoven mat according to claim 11, wherein said aluminosilicate-based fibers are at least 50 percent by weight crystalline.

13. The flexible nonwoven mat according to claim 11, wherein said aluminoborosilicate-based fibers are at least 75 percent by weight crystalline.

14. The flexible nonwoven mat according to claim 11, wherein said aluminosilicate-based fibers are crystalline.

15. The flexible nonwoven mat according to claim 7, which is essentially free of shot.

16. The flexible nonwoven mat according to claim 7, said mat being essentially free of ceramic fiber having a diameter less than 5 micrometers.

17. The flexible nonwoven mat according to claim 7, said mat being essentially free of ceramic fiber having a diameter less than 3 micrometers.

18. The flexible nonwoven mat according to claim 7, wherein at least a portion of said aluminosilicate-based fibers are needle-punched, and wherein said flexible, nonwoven mat has a weight per unit area value in the range from about 50 to about 5000 g/m$^2$.

19. The flexible nonwoven mat according to claim 7, said mat comprising a plurality of layers of said shot-free ceramic oxide fibers.

20. The flexible nonwoven mat according to claim 7, further comprising high strength fibers selected from the group consisting of silicon carbide fibers, silicon nitride fibers, carbon fibers, glass fibers, stainless steel fibers, brass fibers, and mixtures thereof.

21. The flexible nonwoven mat according to claim 7, further comprising fugitive fibers.

22. The flexible nonwoven mat according to claim 7, needle-punched, nonwoven mat comprising fibers selected from the group consisting of silicon carbide fibers, carbon fibers, silicon nitride fibers, glass fibers, stainless steel fibers, brass fibers, fugitive fibers, and mixtures thereof.

23. The flexible nonwoven mat according to claim 7, which is at least one of filtration media, thermal insulation, acoustic insulation, mounting mat, gasket material, or catalyst support.

24. The flexible nonwoven mat according to claim 3 having an average of at least 5 needle punches/cm$^2$ and which can be bent back upon itself without breaking more than 1 percent of said aluminosilicate-based fibers and said quartz fibers present.

25. A method for making a flexible nonwoven mat, the method comprising the steps of:
 (a) providing a flexible nonwoven mat comprising shot-free ceramic oxide fibers, wherein said shot-free ceramic oxide fibers have a diameter greater than 5 micrometers and a length greater than about 1.5 cm, wherein said shot-free ceramic oxide fibers are selected from the group consisting of (a) aluminosilicate-based fibers comprising aluminum oxide in the range from 60 to about 85 percent by weight and silicon oxide in the range from about 40 to about 15 percent by weight silicon oxide, based on the total weight of said aluminosilicate-based fibers, said aluminosilicate-based fibers being at least 20 percent by weight crystalline; (b) crystalline quartz fibers, and (c) mixtures of (a) and (b), and wherein the combined weight of said aluminosilicate-based fibers and said crystalline quartz fibers is at least 50 percent by weight of the total weight of the nonwoven mat; and
 (b) physically entangling at least a portion of said shot-free ceramic oxide fibers.

26. The method according to claim 25, wherein the combined weight of said aluminosilicate-based fibers and said crystalline quartz fibers is at least about 75 percent by weight of the total weight of said nonwoven mat.

27. The flexible nonwoven mat according to claim 1 wherein said at least a portion of said shot-free ceramic oxide fibers are hydroentangled.

* * * * *

UNITED STATES PATENT AND TRADEMARK OFFICE
CERTIFICATE OF CORRECTION

PATENT NO.: 5,380,580

DATED: January 10, 1995

INVENTOR(S): Rogers et al.

It is certified that error appears in the above-identified patent and that said Letters Patent is hereby corrected as shown below:

On the title page, item [75]:

Inventors: "John J. Rogers; John L. Erickson, both of Ramsey; Stephen M. Sanocki, Stillwater, all of Minn."

should be --John J. Rogers, St. Paul; John L. Erickson, White Bear Lake; Stephen M. Sanocki, Stillwater; all of Minn.-- col. 2, under *Attorney, Agent, or Firm*, "Walter N. Kirnn" should be --Walter N. Kirn--.

col. 1, under OTHER PUBLICATIONS, lines 4-6 ""Systems Appraoch to Packaging Design for Automotive Catalytic Converts," SAE 900500, Stroom et al., International Congress and Expositon, Detroit, Mich.,"

should be --"Systems Approach to Packaging Design for Automotive Catalytic Converters," SAE 900500, Stroom et al., International Congress and Exposition, Detroit, Mich.,--

UNITED STATES PATENT AND TRADEMARK OFFICE
CERTIFICATE OF CORRECTION

PATENT NO. : 5,380,580
DATED : January 10, 1995
INVENTOR(S) : Rogers, et al.

It is certified that error appears in the above-indentified patent and that said Letters Patent is hereby corrected as shown below:

Col. 13, line 1, "(0,005 inch)" should be --(0.005 inch)--.

Signed and Sealed this

Twentieth Day of June, 1995

Attest:

BRUCE LEHMAN

Attesting Officer

Commissioner of Patents and Trademarks